United States Patent
Lender et al.

(10) Patent No.: US 9,556,361 B2
(45) Date of Patent: Jan. 31, 2017

(54) ROOF STRUCTURE WITH A METALLIC COATING COMPOSITION HAVING IMPROVED SOLAR REFLECTANCE AND ANTI-SETTLING PROPERTIES

(71) Applicant: Henry Company LLC, El Segundo, CA (US)

(72) Inventors: Ariel Lender, Schwenksville, PA (US); Norman R. Davies, Pottstown, PA (US)

(73) Assignee: Henry Company LLC, El Segundo, CA (US)

( * ) Notice: Subject to any disclaimer, the term of this patent is extended or adjusted under 35 U.S.C. 154(b) by 0 days.

(21) Appl. No.: 14/993,425

(22) Filed: Jan. 12, 2016

(65) Prior Publication Data

US 2016/0122589 A1 May 5, 2016

Related U.S. Application Data

(62) Division of application No. 13/345,924, filed on Jan. 9, 2012, now Pat. No. 9,267,290.

(60) Provisional application No. 61/451,583, filed on Mar. 10, 2011.

(51) Int. Cl.
| | | |
|---|---|---|
| *C09D 195/00* | (2006.01) | |
| *D06N 5/00* | (2006.01) | |
| *E04D 5/10* | (2006.01) | |
| *C08K 7/28* | (2006.01) | |
| *C08K 3/08* | (2006.01) | |

(52) U.S. Cl.
CPC ............. *C09D 195/00* (2013.01); *C08K 3/08* (2013.01); *C08K 7/28* (2013.01); *C08K 2003/0812* (2013.01); *E04D 5/10* (2013.01)

(58) Field of Classification Search
CPC ............. D06N 5/00; C04B 26/26; E04D 5/00; E04D 7/00; C09D 195/00; C08L 95/00
See application file for complete search history.

(56) References Cited

U.S. PATENT DOCUMENTS

| | | | | |
|---|---|---|---|---|
| 3,869,297 A * | 3/1975 | Bellomy | ............ | C09D 195/005 |
| | | | | 106/277 |
| 5,554,215 A | 9/1996 | Simpson et al. | | |
| 2008/0203336 A1 | 8/2008 | Irisawa | | |
| 2008/0241472 A1 | 10/2008 | Shiao et al. | | |
| 2009/0087553 A1 | 4/2009 | O'Keefe | | |
| 2010/0203336 A1 * | 8/2010 | Shiao | .................... | C04B 18/021 |
| | | | | 428/404 |
| 2011/0146531 A1 * | 6/2011 | Mitra | .................... | C08K 5/101 |
| | | | | 106/18.26 |

FOREIGN PATENT DOCUMENTS

WO    WO 2008147972 A1 * 12/2008

OTHER PUBLICATIONS

Cao et al. "Preparation and Performance Research of Thermosetting Heat Reflective Coating for Asphalt". (2011). Advances in Composites, Part 1-11. Trans Tech Publications Ltd. Online version available at: http://app.knovel.com/hotlink/pdf/id:kt00U0TV94/advances-in-composites/preparation-performance.*

Bu, Jinglong Jiang Zhengyi Jiao, Sihai (2011) Advances in Composites, Part 1-11; Preparation and Perfomance Research of Themosetting Heat Relective Coating for Asphalt Pavement; Trans Tech Publications Ltd. Online Version Available At: http://app.knovel.com/hotlink/pdf/id:kt0OUOTV94/advances-in-composites/preparation-performance.

* cited by examiner

*Primary Examiner* — Pegah Parvini
*Assistant Examiner* — Alexandra M Moore
(74) *Attorney, Agent, or Firm* — Baker & Hostetler LLP

(57) ABSTRACT

Reflective bituminous coating compositions are within the disclosure herein that include a bituminous component; a petroleum distillate solvent, a fibrous material; a reflective metallic filler component; and expanded glass granules.

7 Claims, No Drawings

ROOF STRUCTURE WITH A METALLIC COATING COMPOSITION HAVING IMPROVED SOLAR REFLECTANCE AND ANTI-SETTLING PROPERTIES

CROSS REFERENCE TO RELATED APPLICATIONS

This application is a divisional application of U.S. patent application Ser. No. 13/345,924, filed Jan. 9, 2012, which claims the benefit of U.S. Provisional Application No. 61/451,583, filed Mar. 10, 2011 the entire disclosures of which are incorporated by reference herein in their entirety.

BACKGROUND OF THE INVENTION

The invention relates to the field of metallic reflective filler-containing coatings, particularly such coatings as are applied to roofing and other surfaces to impart solar reflectance.

DESCRIPTION OF RELATED ART

Aluminum and other reflective coatings are known for use in roofing and other applications as a way to impart solar reflectance to structures to which they are applied. This results in protection of the underlying surface as well as energy savings that stem from reduced building cooling costs in hot climates. Solar reflectance is the measure of the fraction of incident solar energy that is reflected by a given surface. One way this is measured in the art is that different roof surfaces and roof coatings have different Solar Reflectance Indices (SRI). The SRI measures a roof's ability to reject solar heat demonstrated by temperature rise. Standard black roofing, which would have a solar reflectance of about 0.05 (and an emittance of about 0.90) has an SRI of 0 while a standard white roof having a reflectance of about 0.80 (and an emittance of about 0.90) has an SRI of 100. Standard black roofing has a temperature rise of about 90° F. (50° C.) when fully exposed to the sun, and standard white roofing would have a temperature rise of only about 14-15° F. (about 8° C.). The SRI of a material is calculated by interpolating its temperature rise between the values for white and black roofing. Materials having high SRI values are those which demonstrate cool roofing selections.

Traditional reflective coatings comprise aluminum and are formulated so as to maximize solar reflectance properties as a function of total aluminum pigment in the formulation. Attempts are made to achieve the highest possible solar reflectance value at the lowest possible use of aluminum pigment so as to minimize cost of the resulting coatings and products to which they are applied.

Other challenges in the art of forming such coatings are to minimize hard-packed settling which occurs in the container in which the coating is packaged. This hard-packed condition can further deteriorate the longer the container is held in storage prior to use and further promoted when the container is stored in hot and/or non-temperature controlled warehousing conditions. This problem causes the applicator to severely struggle in stirring the coating to uniformity in the container prior to applying the coating to a surface. Prior solutions to reducing hard-packed settling properties in such coatings include use of surface active agents, thixotropic agents, and other rheological modifiers that may aid in preventing hard packed settling in the product container. These traditional approaches have the detrimental effect of reducing or inhibiting solar reflectance properties of the dried coating thereby causing less efficient use of the high cost aluminum pigment.

Prior art attempts in improving solar reflectance properties to counteract the negative affect to settling associated with traditional anti-settling concepts in such coatings have met with varying success and/or have imparted unwanted additional cost to the overall formulation, and in the case of using additional solvents, have contributed to increasing the coatings volatile organic compound (VOC) load.

BRIEF SUMMARY OF THE INVENTION

The invention includes a reflective bituminous coating composition, comprising a bituminous component; a fibrous material; a reflective metallic filler component; and expanded glass granules. The bituminous component may comprise one or more asphaltic cutback compositions in mineral spirits. Examples of such asphaltic cutback compositions comprise one or more of a 40-65 Pen Asphalt or a 0-50 Pen Oxidized Asphalt cutback base.

The composition may further comprise one or more petroleum distillate solvents. The fibrous material used may be selected from the group consisting of cellulosic fibers; carbon fibers; gypsum/cellulosic fibers; polymeric fibers; glass fibers; mineral fibers; graphite fibers; metallic fibers; and combinations, mixtures, blends, weaves and mats thereof.

If polymeric fibers are used, they may be selected from the group consisting of aramids, polyamides, polypropylenes, polyethylenes, polyarylenes and polyarylene ethers and combinations and copolymers thereof.

The metallic filler component preferably comprises aluminum pigment in flake or particle form. If aluminum is used, it is preferred that it is a leafing flake of aluminum pigment in a mineral spirit paste form.

The expanded glass granules preferably have an average particle size of about 0.1 to about 2.0 mm, and more preferably about 0.1 mm to about 0.3 mm. Such expanded glass granules preferably are amorphous and preferably have a specific gravity of 0.5 g/cm$^3$ to about 1.0 g/cm$^3$.

The coating composition may also comprise polymeric microspheres having a particle size of about 20 microns to about 160 microns and that preferably have a specific gravity of about 0.05 g/cm$^3$ to about 0.2 g/cm$^3$.

In one embodiment herein, the invention includes a reflective bituminous coating composition, comprising a bituminous component; a fibrous material; a reflective metallic filler component; and expanded glass granules. The bituminous component may comprise one or more asphaltic cutback compositions in mineral spirits. The bituminous component may comprise asphaltic cutback compositions which may be one or more of a 40-65 Pen Asphalt or a 0-50 Pen Oxidized Asphalt cutback base. The composition may also further comprise one or more petroleum distillate solvents.

The invention also includes a reflective bituminous coating composition, comprising about 15 to about 80 weight percent of a bituminous component; about 0.1 to 30 weight percent of a fibrous material; about 1 to about 50 weight percent of a reflective metallic filler component; and about 0.1 to about 20 weight percent expanded glass granules.

The invention also provides an improvement for a method of making reflective bituminous coating compositions having solar reflective properties, wherein the improvement comprises providing to the reflective bituminous coating composition about 0.1 to about 20 weight percent of expanded glass granules. The improvement may further compromise providing polymeric microspheres to the composition.

The invention also includes a roof structure having a substrate surface thereon, wherein the substrate surface comprises on at least one surface thereof a reflective bituminous coating, wherein the coating was formed by drying a composition comprising a bituminous component; a fibrous material; a reflective metallic filler component; expanded glass granules.

The composition may further comprise polymeric microspheres and/or one or more petroleum distillate solvents.

The invention includes a roof structure having a substrate surface thereon, wherein the substrate surface comprises on at least one surface thereof a reflective bituminous coating, wherein the coating was formed by drying a composition comprising a bituminous component; a fibrous material; a reflective metallic filler component; expanded glass granules; and polymeric microspheres. The composition may further comprise one or more petroleum distallate solvents.

DETAILED DESCRIPTION OF THE INVENTION

Depending on the processing method(s) chosen to produce the coating, the single or blended asphalt selected as the base material of the composition may be of a penetration grade ("pen grade") at 25° C., when tested according to ASTM method D 5, of about 0.5 dmm to about 70 dmm preferably about 20 dmm to about 50 dmm (all at 25° C.). Similarly, it may be desirable to that the selected asphalt has a softening point of about 60° C. to about 80° C.

The asphalt content may be varied in an inverse manner with respect to the other components, however, the asphalt content must not be so high that the composition cannot be processed, nor so low that it cannot provide an acceptable coating film or layer in a desired end application. As an example, the total asphalt in the composition may be an amount of about 15 to about 80 weight percent, preferably about 18 weight percent to about 60 weight percent, and most preferably about 18 weight percent to about 45 weight percent of the total formulation, and preferably is provided in the form of a mineral spirits cutback, such as a 40-65 pen asphalt cutback in mineral spirits and/or an asphalt cement base cutback such as an A-4 cutback in mineral spirits.

The composition is prepared and applied to a substrate or surface to form a solar reflective coating layer. The substrate may be of any material to which one wishes to apply a reflective aluminum-containing coating. Illustration examples are roofing substrates such as built-up-roofing (BUR), asphalt composition membranes, sheeting, existing coatings, metal substrates, partial metal substrates, and concrete. The substrate may be in any form or shape, including roofing, walls, and other surfaces which may benefit from an aluminum-containing reflective coating. The coating layer may be applied continuously or discontinuously in that it may cover some or all of the substrate to which it is applied.

Fibers may be provided formed from a variety of materials, including cellulosic fibers; carbon fibers; gypsum/cellulosic fibers and mats; polymeric fibers such as aramids, polyamides, polypropylenes, polyethylenes, polyarylenes and polyarylene ethers such as PEEK, PEK, PEKK and combinations and copolymers of such polymeric fibers; glass fibers; mineral fibers; graphite fibers; metallic fibers; and the like, and combinations, mixtures, blends, weaves and mats formed therefrom which may be used in quantities known in the art and/or which may be varied for different properties and coating effects. Preferably cellulosic fibers are provided which may be pre-dispersed and readily mixed into the compositions for providing reinforcement and consistency. Suitable fibers, include Cellulose CF-425, available from Custom Fibers Corp and Cellulose CF-725 also available from Custom Fibers Corp and/or alternate and functionally equivalent grades from Interfibe Corp. Such fibers may be used alone or in combination and preferably comprise about 0.1 weight percent to about 30 weight percent of the composition, preferably about 1 weight percent to about 10 weight percent of the composition, and most preferably about 3 to about 5 weight percent of the composition.

Metallic reflective fillers are provided in a reflective metallic filler component in the compositions herein, such as pigments or additives, are preferably used to provide the reflectivity properties to the coating. Preferably, a reflective metal pigment such as aluminum, tin, chromium, silver, zinc or gold or metallic oxide, such as aluminum oxide, chromic oxide, silver oxide, zinc oxide, gold oxide and the like in particle or flake form is used. Aluminum flake of the leafing or non-leafing type, preferably the leafing type, may be used having flakes of about 10 to 80 microns measured along the longest dimension of the flake. The flakes may be surface treated if desired. Additionally, infrared reflective flakes may be provided as described in U.S. Patent Publication No. 2009/0087553-A1 that include an infrared reflective core flake (wherein the core has a thickness of less than 0.2 μm) and an infrared transparent material which is coated on some or all of the surface of the core flake, wherein the transparent layer includes a binder material that may be optionally colored. The reflective core includes metallic or conductive oxide material, incorporated herein in relevant part.

The reflective metallic filler component may be provided as solid additives or in solution or paste form, such as, for example, an aluminum paste in mineral spirits (at about 60 to 75% metal content). Such additives may be provided to the composition in amounts of from about 1 to about 50 percent by weight of the composition, preferably about 3 to about 25 percent by weight and most preferably about 5 to about 18 percent by weight of the composition.

Expanded glass granules such as those sold as Poraver® beads are preferred for use herein. Such granules are microspheric and preferably about 0.1 mm to about 2.0 mm, preferably about 0.1 mm to about 0.3 mm in diameter measured along the longest dimension of the beads. Such beads with shear form particulates but retain structural integrity instead of being crushed in the manner of standard glass. The glass granules or beads should be amorphous low density materials with granular sizes noted above and having a specific gravity out 0.5 g/cm$^3$ to about 1 g/cm$^3$. About 0.1 to about 20 parts by weight of such glass granules are preferably provided to the composition, and more preferably about 1 to about 10, and more preferably about 3 to about 6 weight percent of the composition.

It is preferred also that the expanded glass granules be used in conjunction with other polymeric microspheres having a particle size of about 20 microns to about 160 microns and a density of about 0.05 g/cm$^3$ to about 0.2 g/cm$^3$ such as expanded Perlite or similar materials for low density properties.

Other additives may also be provided to the composition, such as dessicants for binding free water to avoid hydrogen gassing, rheological or thixotropic agents for enhancing mixing and soft-settling of the composition, and optional solvents such as hi-flash naphtha (having a flash point of over about 100° F.) and preferably avoiding use, where possible, of certain VOCs such as benzene or toluene. The composition is preferably also formed using a petroleum solvent base material, such as an aliphatic petroleum distillate such as mineral spirits and an aromatic petroleum distillates such as high flash naphtha. In making the composition, a base material, such as mineral spirits is first metered and mixed using a low shear folding or blending apparatus, such as a ribbon blender for example. To that base material are added any rheological or thixotropic additives with further mixing for several minutes. Any dessicants are then added to maintain properties in the mixture as noted above. The remaining components but for the fiber material are then added and mixed into the solution. With respect to the fiber material, it is preferred for certain types of fiber that if it is tightly packed for shipment, that before adding it to the composition, it is predispersed sometimes referred to "fluffed" either by hand or using equipment to separate the fibers before using as a composition having such materials therein. The composition is then further mixed for a period of time of several minutes to about one half hour. The composition is then balanced further through addition of bituminous cutback and/or through solvents as noted above to achieve composition properties. The composition can then be adjusted one way or the other through use in thinning (mineral spirits) or thickening agents (additional fiber, for example).

The coating composition may be applied to any substrate wherein solar reflectivity is desired. It is applied in liquid form over an appropriate substrate and then dried or cured, thereby forming a coating layer. Application may be accomplished by any means in the art, for example, brushing, rolling or spraying. Drying may occur naturally such as air drying. The relative humidity and temperature at which this drying process occurs may vary. For example in may be desirable that the rapid rate of drying is accomplished at temperatures of about 0 or less than 0° C. up to about 37° C. and/or at relative humidity of about 5% to about 100% and about 10% to about 90%, and about 20% to about 80%.

The invention will now be described with respect to the following non-limiting example.

EXAMPLE

Mineral spirits were metered out in the quantity shown in Table 1 below and mixed using a ribbon blender. To the mineral spirits, Baragel® 3000/Pangel® B-10 rheology additives were provided in the amount noted in Table 1, and the mixture was mixed for 5 minutes at low shear. To this mixture, Syloid® AR-1/Syloid® AL-1/Gasil® GM2 was added in the amount noted in Table 1 as a dessicant additive. This material includes aluminum silicate. Also added were aluminum paste (in 73% composition in mineral spirits), expanded Perlite (SIL-Cell35BC/H900), and Poraver® 0.1-0.3 mm glass granules, each in amounts noted in Table 1. A first asphalt cutback, 40-65 pen asphalt in mineral spirits was metered and mixed into the composition. Two types of cellulose fibers (Cellulose CF-425 and Cellulose CF-725) were fluffed using equipment to pull apart and disperse the fibers and then mixed into the composition. The composition was then mixed for about 15 minutes. A further asphalt cutback, ACB A-4 in the amount of Table 1 was metered and mixed into the composition along with minor amounts of Solvesso®100/Aromatic 100/Hi Sol 10/Vansol® 53/Cansol® SC 100 in admixture to adjust the solution. The properties were measured and mineral spirits and fibers were added to adjust the composition to the right consistency and composition density of about 7.37.

TABLE 1

| Component | Weight percent |
|---|---|
| Dessicant | 0.48 |
| Rheology Additive | 0.35 |
| Expanded Perlite | 1.41 |
| Expanded Glass Granules | 6.19 |
| Cellulose CF-425 | 0.68 |
| Cellulose CF-725 | 2.72 |
| 40-65 pen Asphalt Cutback | 18.39 |
| 0-30 pen Asphalt Cutback | 25.68 |
| Aluminum Paste (73% in Mineral Spirits) | 18.03 |
| Mineral Spirits | 24.52 |
| Petroleum Distillate Solvents | q.s. to 100% and to adjust viscosities |

The resulting formulation using light weight inorganic aggregate fillers and/or polymeric microspheres, including and particularly the expanded glass granules aids in providing as good or better solar reflectance properties while simultaneously improving settling and reducing the effect of hard-packed settling. Higher solar reflectance properties are not sacrificed to achieve good settling, and vice versa. The invention provides the advantage of ease of manufacture and less re-stirring at the end use application so that the coating appearance when applied is more consistent without sacrificing good solar properties.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A roof structure having a substrate surface thereon, wherein the substrate surface comprises on at least one surface thereof a reflective bituminous coating, wherein the coating was formed by drying a composition consisting of at least one petroleum distillate solvent and about 15 to about 80 weight percent of a mixture of bituminous components selected from the group consisting of a 40-65 Pen Asphalt cutback, an oxidized asphalt 0-50 Pen Asphalt cutback base, a non-oxidized asphalt 0-50 Pen Asphalt cutback base, an oxidized asphalt 0-30 Pen Asphalt cutback base, a non-oxidized asphalt 0-30 Pen Asphalt cutback base and any combinations and mixtures thereof;
 0.1 to 30 weight percent of a fibrous material selected from the group consisting of cellulosic fibers, carbon fibers, gypsum/cellulosic fibers, polymeric fibers, glass fibers, mineral fibers, graphite fibers, metallic fibers and any combinations and mixtures thereof;
 1 to 50 weight percent of a reflective metallic filler component selected from the group consisting of aluminum pigment in flake or particle form; and
 0.1 to 20 weight percent expanded glass granules having an amorphous low density and having an average particle size of about 0.1 mm to about 2.0 mm and having specific gravity of about 0.5 g/cm$^3$ to about 1 g/cm$^3$.

2. The roof structure according to claim 1, wherein the bituminous components comprise at least one of a 40-65 Pen Asphalt cutback and an oxidized or non-oxidized asphalt 0-50 Pen Asphalt cutback base.

3. The roof structure according to claim 1, wherein the bituminous components comprise at least one of a 40-65 Pen Asphalt cutback and an oxidized or non-oxidized asphalt 0-30 Pen Asphalt cutback base.

4. The roof structure according to claim 1, wherein the polymeric fibers are selected from the group consisting of aramids, polyamides, polypropylenes, polyethylenes, polyarylenes and polyarylene ethers and combinations thereof.

5. The roof structure according to claim 1, wherein the aluminum is a leafing flake form of aluminum pigment in a mineral spirit paste form wherein the composition further comprises one or more petroleum distillate solvents.

6. The roof structure of claim 1, wherein the expanded glass granules having an average particle size of about 0.1 mm to about 0.3 mm.

7. The roof structure of claim 1, wherein the composition further comprising polymeric microspheres having a particle size of about 20 microns to about 160 microns.

\* \* \* \* \*